United States Patent
Wu

(10) Patent No.: US 8,564,637 B2
(45) Date of Patent: Oct. 22, 2013

(54) CONFERENCE CONTROL METHOD, AND RELEVANT APPARATUS AND SYSTEM

(71) Applicant: Huawei Device Co., Ltd., Guangdong (CN)

(72) Inventor: Jiaoli Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/624,454

(22) Filed: Sep. 21, 2012

(65) Prior Publication Data

US 2013/0016174 A1 Jan. 17, 2013

Related U.S. Application Data

(63) Continuation of application No. PCT/CN2011/081083, filed on Oct. 21, 2011.

(30) Foreign Application Priority Data

Oct. 29, 2010 (CN) .......................... 2010 1 0538279

(51) Int. Cl.
*H04N 7/14* (2006.01)

(52) U.S. Cl.
USPC ........................................ 348/14.01; 709/204

(58) Field of Classification Search
USPC .............. 348/14.01–14.08; 725/62, 106, 133, 725/141, 153; 709/204–206; 370/260–271
See application file for complete search history.

(56) References Cited

U.S. PATENT DOCUMENTS

| 8,243,694 B2 | 8/2012 | Kowalewski | |
|---|---|---|---|
| 2004/0249889 A1* | 12/2004 | Drommond | 709/204 |
| 2006/0079262 A1* | 4/2006 | Harris et al. | 455/520 |
| 2008/0267282 A1 | 10/2008 | Kalipatnapu et al. | |
| 2010/0013905 A1 | 1/2010 | Kumar et al. | |

(Continued)

FOREIGN PATENT DOCUMENTS

| CN | 101252671 A | 8/2008 |
|---|---|---|
| CN | 101404726 A | 4/2009 |
| CN | 101534413 A | 9/2009 |
| CN | 101583011 A | 11/2009 |
| CN | 101656863 A | 2/2010 |

(Continued)

OTHER PUBLICATIONS

International Search Report in corresponding International Patent Application No. PCT/CN2011/081083 (Jan. 19, 2012).

(Continued)

*Primary Examiner* — Curtis Kuntz
*Assistant Examiner* — Maria El-Zoobi
(74) *Attorney, Agent, or Firm* — Leydig, Voit & Mayer, Ltd.

(57) ABSTRACT

Embodiments of the present invention disclose a conference control method, and a relevant apparatus and system. A conference control method includes: receiving a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier; and if determining to give floor to the floor requesting area corresponding to the first area identifier, broadcasting a speaking video corresponding to the floor requesting area to a site terminal of at least one of sites except the site corresponding to the first site identifier in the first conference.

18 Claims, 8 Drawing Sheets

(56) References Cited

U.S. PATENT DOCUMENTS

| | | | |
|---|---|---|---|
| 2010/0115089 A1* | 5/2010 | Gonzalez et al. | 709/224 |
| 2011/0193936 A1 | 8/2011 | Gai | |
| 2012/0033030 A1* | 2/2012 | Liu et al. | 348/14.08 |
| 2012/0056974 A1 | 3/2012 | Wu | |
| 2012/0069133 A1* | 3/2012 | Wu | 348/14.03 |

FOREIGN PATENT DOCUMENTS

| | | |
|---|---|---|
| EP | 2018011 A1 | 1/2009 |
| JP | 2009021922 A | 1/2009 |
| WO | WO 2010097044 A1 | 9/2010 |

OTHER PUBLICATIONS

Written Opinion of the International Searching Authority in corresponding International Patent Application No. PCT/CN2011/081083 (Jan. 19, 2012).

Camarillo et al., "RFC-4582—The Binary Floor Control Protocol (BFCP)," Nov. 2006, Internet Engineering Task Force, Fremont, California.

1st Office Action in corresponding Chinese Patent Application No. 201010538279.0 (Apr. 3, 2013).

Extended European Search Report in corresponding European Patent Application No. 11835608.8 (Jul. 19, 2013).

* cited by examiner

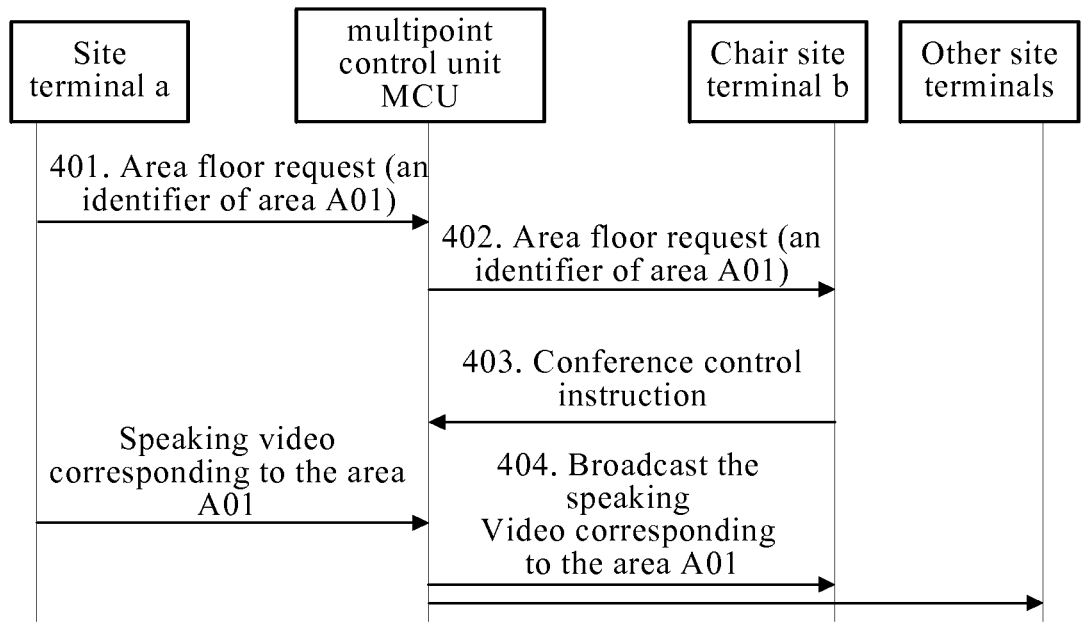
FIG. 4
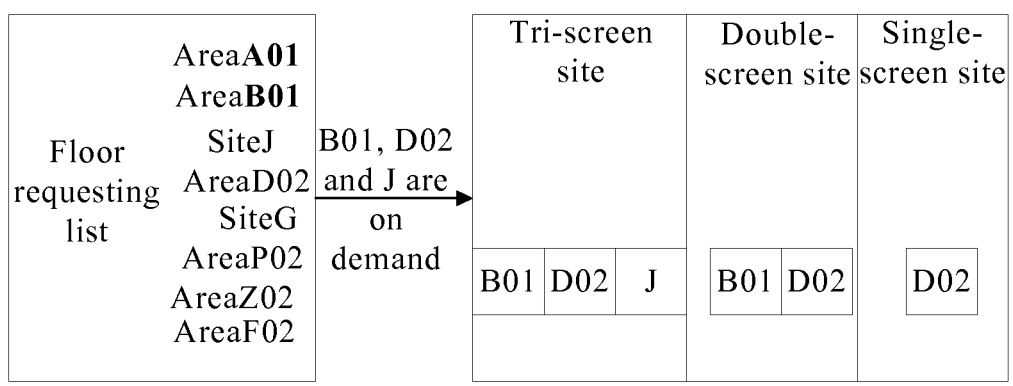
FIG. 5-a

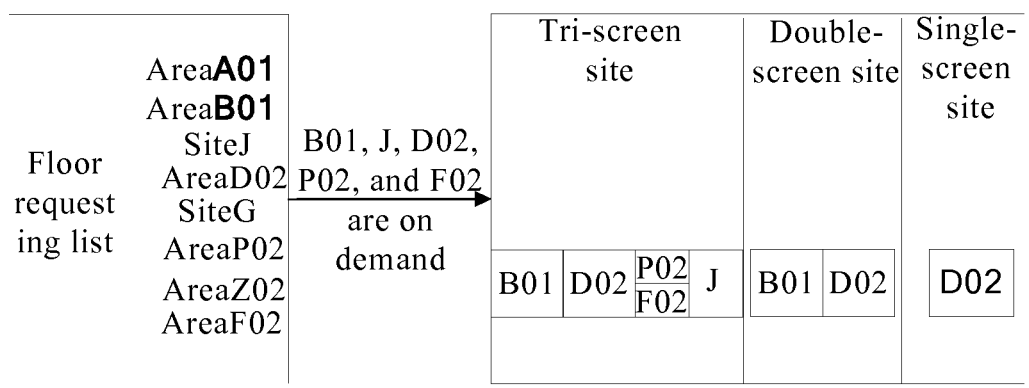
FIG. 5-b
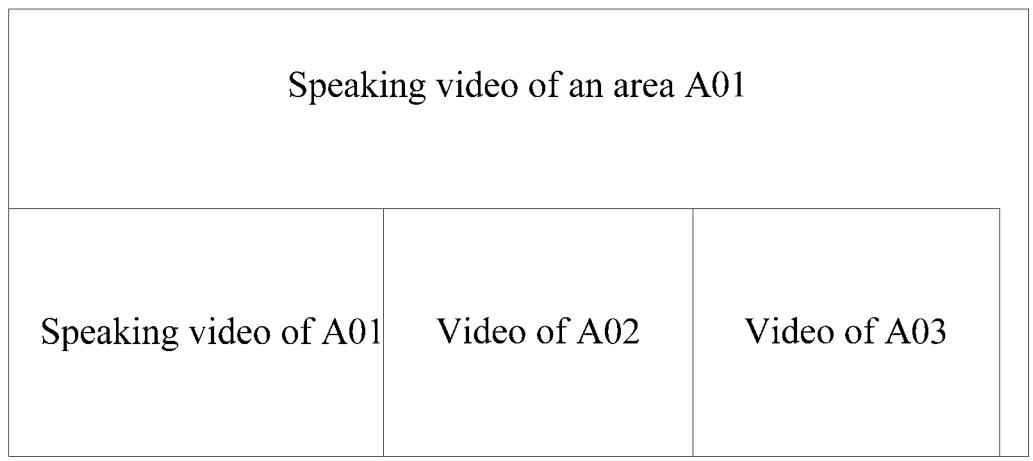
FIG. 6

FIG. 7-a

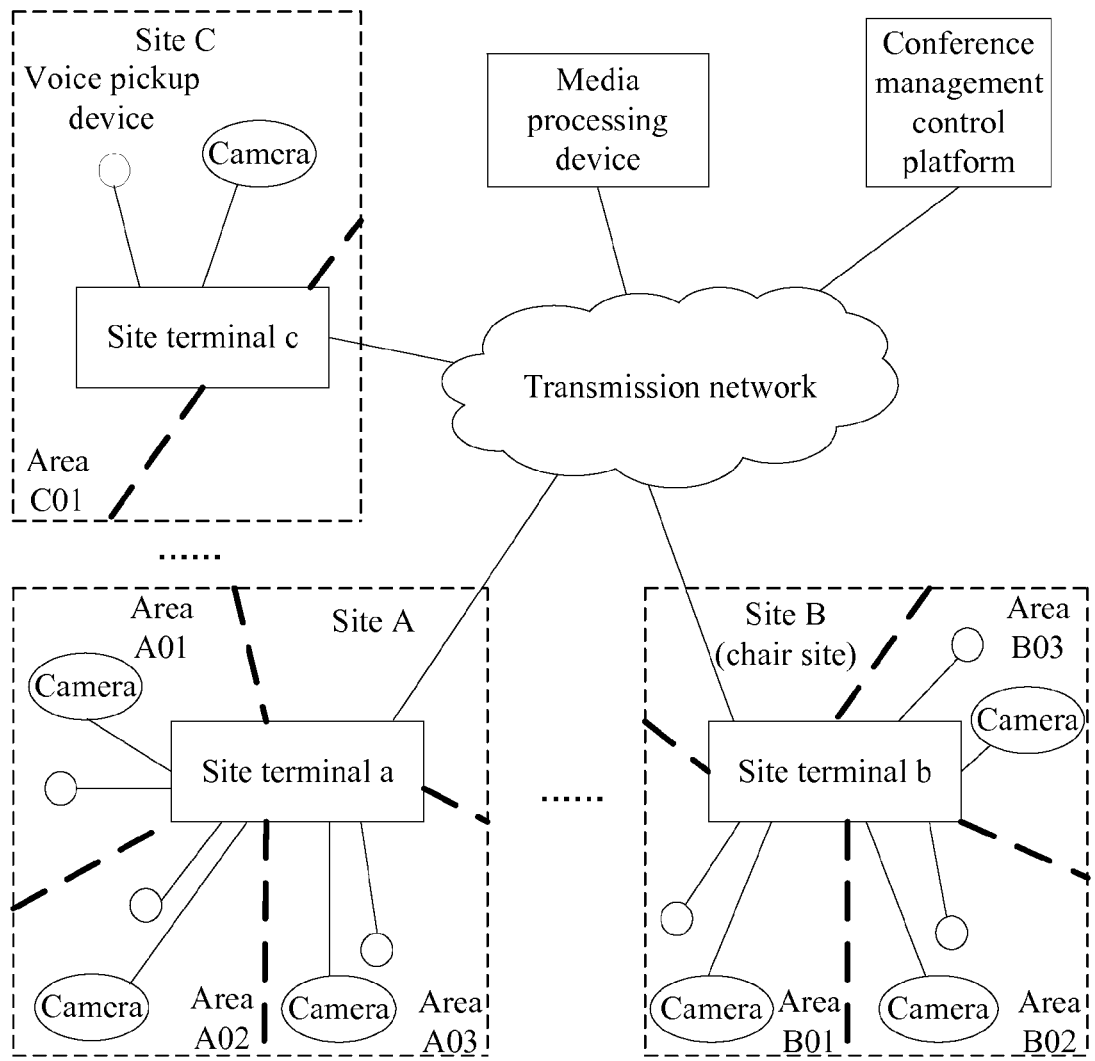
FIG. 7-b
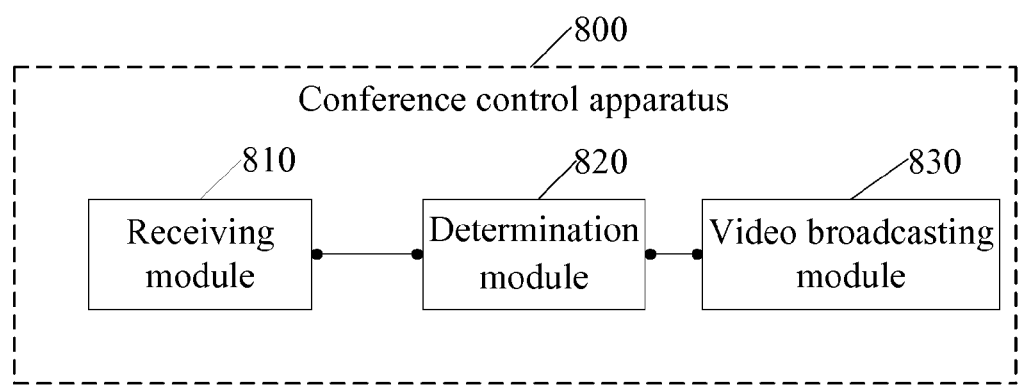
FIG. 8

US 8,564,637 B2

CONFERENCE CONTROL METHOD, AND RELEVANT APPARATUS AND SYSTEM

CROSS-REFERENCE TO RELATED APPLICATIONS

This application is a continuation of International Patent Application No. PCT/CN2011/081083, filed on Oct. 21, 2011, which claims priority to Chinese Patent Application No. 201010538279.0, filed on Oct. 29, 2010, both of which are hereby incorporated by reference in their entireties.

FIELD OF THE INVENTION

The present invention relates to the field of communications technologies, and in particular to a conference control method, and a relevant apparatus and system.

BACKGROUND OF THE INVENTION

With the development of video conferencing technologies, a user site has developed from one camera, one moving video and one moving image to multiple cameras, multiple moving videos and multiple moving images. In the same site, the multiple cameras, the multiple moving videos, and the multiple moving images can be associated with each other in a physical or a logical relationship.

For example, in conference TV networking shown in FIG. 1, multiple cameras, multiple displays (screens) and multiple site terminals (or one site terminal with multiple code streams) can be deployed in a video conferencing site (for example, sites 1 and 2), and the multiple site terminals are interconnected through a multipoint control unit (MCU) to establish a conference. The technology that supports sending images of the multiple cameras to a remote site at the same time and displaying remote multiple video images at the same time has been widely applied in the scenarios such as tele-education and telepresence.

In the existing conferences with multi-screen sites such as tele-education and telepresence, each subordinate site may ask for the floor. In the existing video conferencing TV system, when requesting floor through signaling and a processing policy, a certain site requests floor. A chairman of the conference grants the floor request of the site, and then gives floor to the site and broadcasts the floor to the whole site. In the networking shown in FIG. 1, if site 2 requests floor, a site terminal of site 2 sends a floor request to an MCU; the MCU forwards the floor request to a chair site (for example, site 1 is the chair site); if the chair site grants the floor request of site 2, a site terminal of the chair site sends a request for giving floor to the MCU and broadcasting site 2 to the MCU; the MCU processes the floor giving and broadcasting request from the chair site, and broadcasts multiple images of site 2 to other sites; the other sites view the images of site 2, and meanwhile, the MCU sends voices picked up by all microphones (MICs) at site 2 to the other sites, so that the other sites can hear the voice of whole site 2.

It is found in practice that, when a participant at a certain code stream or on a certain camera in a certain multi-screen site asks for the floor, because not all the people in the whole site ask for the floor, people in other sites may only need to view the speaker on the camera. If the mechanism in the conventional art that the whole site is given floor and broadcast is adopted, all the video code streams (definitely including some unwanted video code streams) of the whole site are broadcast to the other sites, resulting in an unnecessary impact on the network bandwidth and a large waste of bandwidth resources.

SUMMARY OF THE INVENTION

Embodiments of the present invention provide a conference control method, and a relevant apparatus and system, so as to improve the flexibility of conference control, and save bandwidth resources as much as possible.

To solve the foregoing technical problems, the embodiments of the present invention provide the following technical solutions.

A conference control method includes:

receiving a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier; and if determining to give floor to the floor requesting area corresponding to the first area identifier, broadcasting a speaking video corresponding to the floor requesting area to a site terminal of at least one of sites except the site corresponding to the first site identifier in the first conference.

A conference control apparatus includes:

a receiving module, configured to receive a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier;

a determination module, configured to determine whether to give floor to the floor requesting area corresponding to the first area identifier; and a video broadcasting module, configured to, if the determination module determines to give floor to the floor requesting area corresponding to the first area identifier, broadcast a speaking video corresponding to the floor requesting area to a site terminal of at least one of sites except the site corresponding to the first site identifier in the first conference.

A chair site terminal includes:

a receiving module, configured to receive a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier;

a determination module, configured to determine whether to give floor to the floor requesting area corresponding to the first area identifier; and a video broadcasting module, configured to, if the determination module determines to give floor to the floor requesting area corresponding to the first area identifier, trigger a media processing apparatus to broadcast a speaking video of the floor requesting area corresponding to the first area identifier to a site terminal of at least one of sites except the site corresponding to the first site identifier in the first conference.

An apparatus for requesting floor includes:

an obtaining module, configured to obtain a first site identifier and a first area identifier, where a site corresponding to the first site identifier includes multiple areas and belongs to a first conference, and the first area identifier is an area identifier of a floor requesting area at the site corresponding to the first site identifier; and a sending module, configured to generate and send a first area floor request carrying the first site identifier and the first area identifier, so that after a conference control apparatus receives the first area floor request, if determining to give floor to the floor requesting area corresponding to the first area identifier, the conference control apparatus triggers broadcasting of a speaking video corresponding to the floor requesting area to a site terminal of at least one of sites except the site corresponding to the first site identifier in the first conference.

A conference system includes:

an apparatus for requesting floor and a conference control apparatus.

The apparatus for requesting floor is configured to obtain a first site identifier and a first area identifier, where a site corresponding to the first site identifier includes multiple areas and belongs to a first conference, and the first area identifier is an area identifier of a floor requesting area at the site corresponding to the first site identifier; and generate and send a first area floor request carrying the first site identifier and the first area identifier.

The conference control apparatus is configured to receive the first area floor request; and if determining to give floor to the floor requesting area corresponding to the first area identifier, broadcast a speaking video corresponding to the floor requesting area to a site terminal of at least one of sites except the site corresponding to the first site identifier in the first conference.

It can be seen from the above that, in the embodiments of the present invention, the conference site is divided into one or more areas, and floor is requested according to the area in the conference process. When a floor requesting area in a certain site is given floor, only the speaking video corresponding to the floor requesting area may be broadcast to a site terminal of at least one of the other sites in the conference. The processing mechanism refines a target to which the floor is given and that is broadcast, and improves the flexibility of speaking in the conference. Moreover, because only the speaking video corresponding to the floor requesting area may be broadcast, an impact on network bandwidth can be reduced and bandwidth resources can be saved as much as possible.

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are only some embodiments of the present invention, and persons of ordinary skill in the art may further obtain other drawings according to the accompanying drawings without creative efforts.

FIG. 4 is a schematic flow chart of a conference control method of a multi-screen site provided by Embodiment 2 of the present invention;

FIG. 5-a is a schematic diagram of a display mode provided by an embodiment of the present invention;

FIG. 5-b is a schematic diagram of another display mode provided by an embodiment of the present invention;

FIG. 6 is a schematic diagram of another display mode provided by an embodiment of the present invention;

FIG. 7-b is a schematic structural diagram of another conference TV networking provided by Embodiment 2 of the present invention;

FIG. 8 is a schematic diagram of a conference control apparatus provided by an embodiment of the present invention;

DETAILED DESCRIPTION OF THE EMBODIMENTS

Embodiments of the present invention provide a conference control method, and a relevant apparatus and system, so as to improve the flexibility of conference control, and save bandwidth resources as much as possible.

To make the solutions of the present invention more comprehensible for persons skilled in the art, the technical solutions in the embodiments of the present invention are clearly and completely described below with reference to the accompanying drawings in the embodiments of the present invention. It is obvious that the embodiments to be described are only a part rather than all of the embodiments of the present invention. All other embodiments obtained by persons with ordinary skill in the art based on the embodiments of the present invention without creative efforts shall fall within the protection scope of the present invention.

Embodiment 1

In an embodiment of a conference control method of the present invention, the method may include: receiving a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier; and if determining to give floor to the floor requesting area corresponding to the first area identifier, triggering broadcasting of a speaking video corresponding to the floor requesting area to a site terminal of at least one of sites except the site corresponding to the first site identifier in the first conference.

Figure 1:
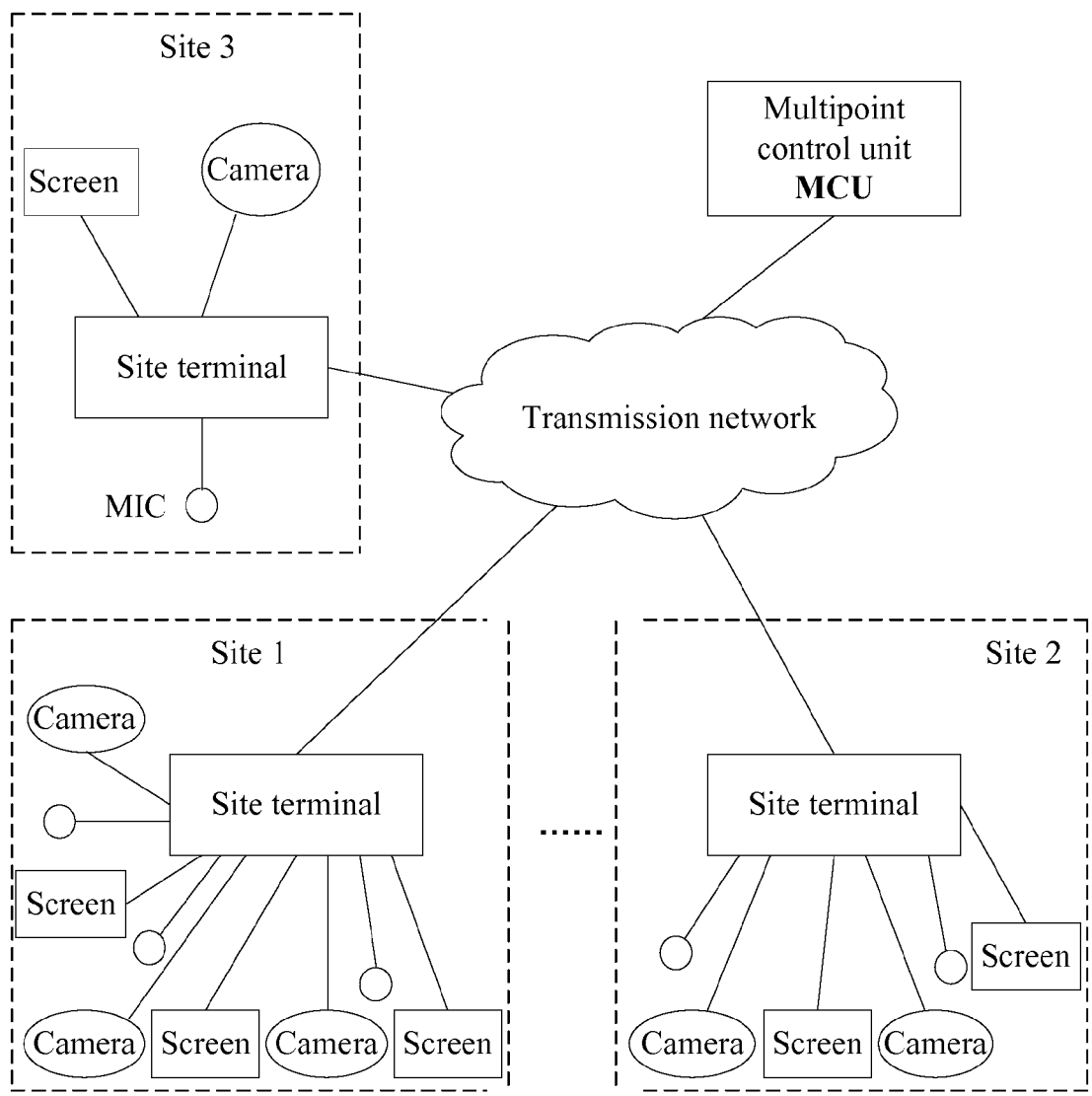
FIG. 1 is a schematic structural diagram of conference TV networking in the prior art.
Figure 2:
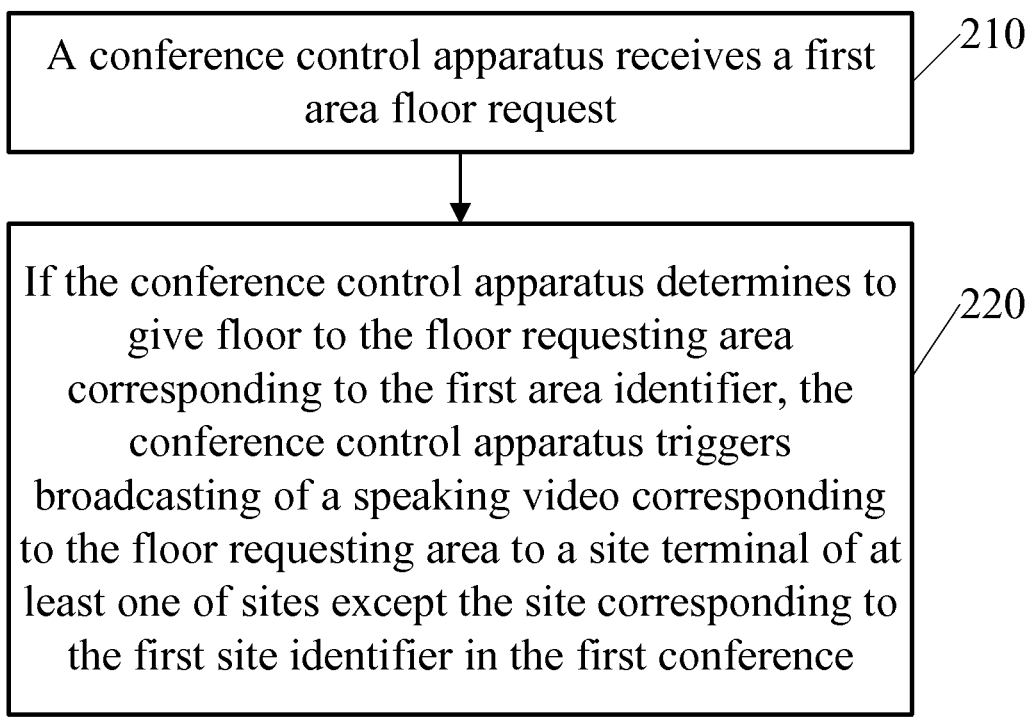
FIG. 2 is a schematic flow chart of a conference control method of a multi-screen site provided by Embodiment 1 of the present invention.

Referring to FIG. 2, the specific steps may include the following:

210: A conference control apparatus receives a first area floor request.

The conference control apparatus may be a conference control device at a network side (for example, a conference control management platform or an MCU) or a conference control device at a terminal side (for example, a site terminal of a chair site in a conference).

In an application scenario, during a conference, if a certain area (for ease of description, the area may be referred to as a first area) in a certain subordinate site (for ease of description, the site may be referred to as a first site, and a site identifier of the site may be referred to as a first site identifier) in the conference needs to request floor, for example, a site terminal of the site (for ease of description, referred to as a first site terminal) may be used as an apparatus for requesting floor, and sends an area floor request (for ease of description, referred to as a first area floor request) to the network side conference control apparatus (for example, a conference control management platform or an MCU), where the first area floor request may carry the first site identifier and a first area identifier (the first area identifier is an area identifier of the first area).

The first site may include multiple areas and belongs to a first conference, and the first conference may further include one or more other sites. It can be understood that, the first area identifier may be any identifier that can be used to distinguish the area from the other areas of the site.

Especially, the floor may not be requested in real time, but floor requests in a statistical period are processed at the same time. If in a statistical period (for example, 30 seconds or 60 seconds), multiple areas in the first site need to request floor, the apparatus for requesting floor (for example, the first site terminal) may obtain area identifiers of the multiple floor requesting areas, and generate and send an area floor request carrying the first site identifier and the area identifiers of the multiple floor requesting areas. The conference control apparatus may receive the area floor request.

In an actual application, the area identifier and the site identifier of the corresponding site may be two independent identifiers or may also be combined into one. For example, when the area identifier includes site identifier information corresponding to the site, that is, the site identifier is used as a part of the area identifier, or the site identifier of the corresponding site may be deduced according to the area identifier. In this scenario, the area floor request may only carry the area identifier actually, but it may still be considered that the area floor request carries the area identifier and the site identifier that are combined into one.

It should be noted that, the network side conference control apparatus is an apparatus capable of managing and processing conference related signaling at the network side, for example, a conference control management platform (if exists). The conference control management platform may manage the signaling such as an area floor request and a site floor request, and control a media processing apparatus or an MCU to process and broadcast an audio or video media stream. In addition, in a networking structure in which no conference control management platform is deployed, the network side conference control apparatus may be an MCU (the MCU herein may be considered to have all or a part of functions of the conference control management platform). The MCU can, actively or in cooperation with the site terminal of the chair site (if exists) in the conference, manage the signaling such as the area floor request and the site floor request, receive the audio or video media stream from a site terminal, and then process and broadcast the audio or video media stream. Definitely, the network side conference control apparatus may be an apparatus with similar functions in other networking. The site terminal of the chair site (if exists) in the conference may be considered as a terminal side conference control apparatus (the site terminal of the chair site may be briefly referred to as a chair site terminal). It can be understood that, a user may directly send a conference control construction to the network side conference control apparatus through the site terminal, and may also send a conference control instruction to the site terminal through other tools with corresponding rights, and then the site terminal forwards the conference control instruction to the network side conference control apparatus. In addition, in another scenario, the conference control instruction such as the area floor request corresponding to the site may also be directly sent to the network side conference control apparatus through other apparatuses without being forwarded by the site terminal. For example, in an IP multimedia subsystem (IMS, IP Multimedia Subsystem) network, a conference server may support several clients. Through an IE browser client, each site may input a site number and log on to the client, and then performs conference control, for example, initiates a request for becoming the chair site. In such a case, the floor request can be directly forwarded to the chair site terminal through the conference server. That is, if the conference control apparatus is the network side conference control apparatus, the conference control apparatus may receive the conference control instruction such as the area floor request from the site terminal, and may also receive the conference control instruction such as the area floor request from other apparatus. If the conference control apparatus is the terminal side conference control apparatus, the conference control apparatus may receive the conference control instruction such as the area floor request from the network side conference control apparatus, and may also receive the conference control instruction such as the area floor request from other apparatus.

220: If the conference control apparatus determines to give floor to the floor requesting area corresponding to the first area identifier, the conference control apparatus triggers broadcasting of a speaking video corresponding to the floor requesting area to a site terminal of at least one of sites except the site corresponding to the first site identifier in the first conference.

If the conference control apparatus is the network side conference control apparatus, and the network side conference control apparatus is, for example, an apparatus that does not have a media processing function such as the conference control management platform, when determining to give floor to the floor requesting area, the conference control apparatus triggers an apparatus that has the media processing function such as a media processing apparatus or an MCU to broadcast the speaking video corresponding to the floor requesting area to a site terminal of at least one of the sites except the site corresponding to the first site identifier in the first conference. If the conference control apparatus is an apparatus that has the media processing function such as an MCU, when determining to give floor to the floor requesting area, the conference control apparatus triggers itself to broadcast the speaking video corresponding to the floor requesting area to a site terminal of at least one of the sites except the site corresponding to the first site identifier in the first conference. If the conference control apparatus is a terminal side conference control apparatus (for example, a chair site terminal), when determining to give floor to the floor requesting area, the conference control apparatus triggers (specifically, directly triggers or indirectly triggers through, for example, the conference control management platform) an apparatus that has the media processing function such as the media processing apparatus or the MCU at the network side to broadcast the speaking video corresponding to the floor requesting area to a site terminal of at least one of the sites except the site corresponding to the first site identifier in the first conference. Definitely, if determining to give floor to the floor requesting area corresponding to the first area identifier, the conference control apparatus may also trigger the broadcasting of the speaking video corresponding to the floor requesting area to site terminals of multiple sites including the site corresponding to the first site identifier in the first conference.

In an application scenario, if determining to give floor to the floor requesting area corresponding to the first area identifier, the network side conference control apparatus or the terminal side conference control apparatus may further trigger the broadcasting of an audio of the first site or the floor requesting area to a site terminal of at least one of sites except the site corresponding to the first site identifier in the first conference. Definitely, the network side conference control apparatus or the terminal side conference control apparatus may also perform mute processing on the audio of the floor requesting area according to an instruction or a preset policy, that is, does not broadcast the audio of the first site or the floor requesting area corresponding to the first area identifier to the other sites.

In an actual application, the network side conference control apparatus or the terminal side conference control apparatus determines to give floor to the floor requesting area in various manners. For example, the network side conference control apparatus may forward a first area floor request to a site terminal of a chair site (if exists) in the first conference, and determines to give floor to the floor requesting area corresponding to the first area identifier if receiving an instruction for giving floor to and broadcasting the floor requesting area corresponding to the first area identifier, where the instruction is sent by the site terminal of the chair site; or the network side conference control apparatus or the terminal side conference control apparatus may also determine to give floor to the floor requesting area corresponding to the first area identifier according to a user instruction or a preset policy.

Further, in the process of giving floor to and broadcasting the floor requesting area corresponding to the first area identifier, the network side conference control apparatus or the terminal side conference control apparatus may further receive signaling such as an area floor request (herein, referred to as a second area floor request) of another site (for example, a second site, and a site identifier of the second site may be referred to as a second site identifier) in the first conference. The second site may also include one or more areas, and the second site belongs to the first conference. The second area floor request carries a second site identifier and a second area identifier, and the second area identifier is an area identifier of a floor requesting area in the second site. If it is determined that the floor requesting area corresponding to the second area identifier is given floor, the broadcasting of the speaking video corresponding to the floor requesting area in the second site to a site terminal of at least one of sites except the site corresponding to the second site identifier in the first conference is triggered, so as to support an on-demand requirement of multiple floor requesting objects. The audio or video media streams of multiple floor requesting areas can be broadcast at the same time. For example, a speaking video corresponding to the floor requesting area in the second site is broadcast to the site terminal of at least one of the sites except the site corresponding to the second site identifier in the first conference, and at the same time, a speaking audio corresponding to the floor requesting area in the second site or an audio of the site is broadcast to the site terminal of at least one of the sites except the site corresponding to the second site identifier in the first conference. The site terminals of the sites in the first conference may fully or selectively display the received speaking video.

Furthermore, the network side conference control apparatus or the terminal side conference control apparatus may also generate and maintain a floor requesting list, so as to effectively manage the floor requesting objects. For example, the network side conference control apparatus or the terminal side conference control apparatus may add a record corresponding to the first area floor request into the floor requesting list of the first conference after receiving the first area floor request, and add a record corresponding to the second area floor request into the floor requesting list of the first conference after receiving the second area floor request. For example, information such as the area identifiers of the floor requesting areas may be added into the floor requesting list, so as to subsequently select, according to the floor requesting list, a floor requesting area that corresponds to the area identifier and to which the floor is given.

In an actual application, if each area at the site may correspond to at least one camera (or one moving video), and the video of the area is shot and captured by the at least one camera; or multiple areas at the site may correspond to one wide-angle camera (the wide-angle camera may shoot the whole site), an apparatus with a media processing function such as a site terminal or an MCU may segment the image according to the area definition, while a speaking video corresponding to a certain floor requesting area corresponds to one segmented image. The apparatus with a media processing function such as the MCU may broadcast the segmented images, or splice and broadcast multiple segmented images.

In an actual application, whether the network side conference control apparatus or the terminal side conference control apparatus selects one or more floor requesting areas at the same time for giving floor and broadcasting, a display position of the speaking video corresponding to the floor requesting area to which the floor is given and that is broadcast on the screen of each site can be determined. For example, a speaking video corresponding to each speaking area is displayed on a corresponding screen of each site by default (for example, a speaking video captured by a camera 1 of a certain site is correspondingly displayed on a screen 1 of each site, or a speaking video sent by a site terminal of a single-screen site is correspondingly displayed on a main screen or all screens of a multi-screen site at the same time). If a display conflict occurs, cover replacement may be performed, or it may be first determined whether an idle screen (for example, a default screen does not correspond to the speaking object which the floor is given and that is broadcast currently) exists, and if yes, the idle screen is preferentially replaced; if not, the cover replacement is performed. Or, if only one speaking area is given floor and is broadcast once, the corresponding speaking video may be displayed on the main screen or all screens of each site by default. Or, the network side conference control apparatus or the chair site terminal (according to a user instruction or a preset policy) designates correspondence between a speaking video corresponding to each floor requesting area and a display screen of each site, and then at each site, the speaking video corresponding to the floor requesting area is displayed on the corresponding display screen according to the designated correspondence. Or, the network side conference control apparatus or the chair site terminal may prioritize the floor requesting areas. The sequence of the priorities may correspond to a sequence of serial numbers of the screens, and speaking videos of the floor requesting areas that are prioritized in the front are preferentially displayed. For example, in a single-screen site, only a speaking video of a floor requesting area with the highest priority can be displayed. Definitely, the network side conference control apparatus or a site terminal of the chair site may also combine and use the foregoing display policies according to the actual requirements, or select other display policies, which are not listed in detail herein.

The embodiment of the present invention further provides a method for requesting floor, where the method may include: obtaining a first site identifier and a first area identifier, where a site corresponding to the first site identifier includes multiple areas and belongs to a first conference, and the first area identifier is an area identifier of a floor requesting area at the site corresponding to the first site identifier; generating and sending a first area floor request carrying the first site identifier and the first area identifier, so that after a conference control apparatus receives the first area floor request, if determining to give floor to the floor requesting area corresponding to the first area identifier, the conference control apparatus triggers broadcasting of a speaking video corresponding to the floor requesting area to a site terminal of at least one of sites except the site corresponding to the first site identifier in the first conference. The method for requesting floor can be specifically implemented on a site terminal or other apparatus.

It can be seen from the above that, in this embodiment, the site of the conference is divided into one or more areas, and floor is requested according to the area in the conference process. When a floor requesting area in a certain site is given floor, only the speaking video corresponding to the floor requesting area may be broadcast to a site terminal of at least one of the other sites in the conference. The processing mechanism refines a target to which the floor is given and that is broadcast, and improves the flexibility of the conference speaking Moreover, because only the speaking video corresponding to the floor requesting area may be broadcast, an impact on network bandwidth can be reduced and bandwidth resources can be saved as much as possible.

Embodiment 2

Figure 3:
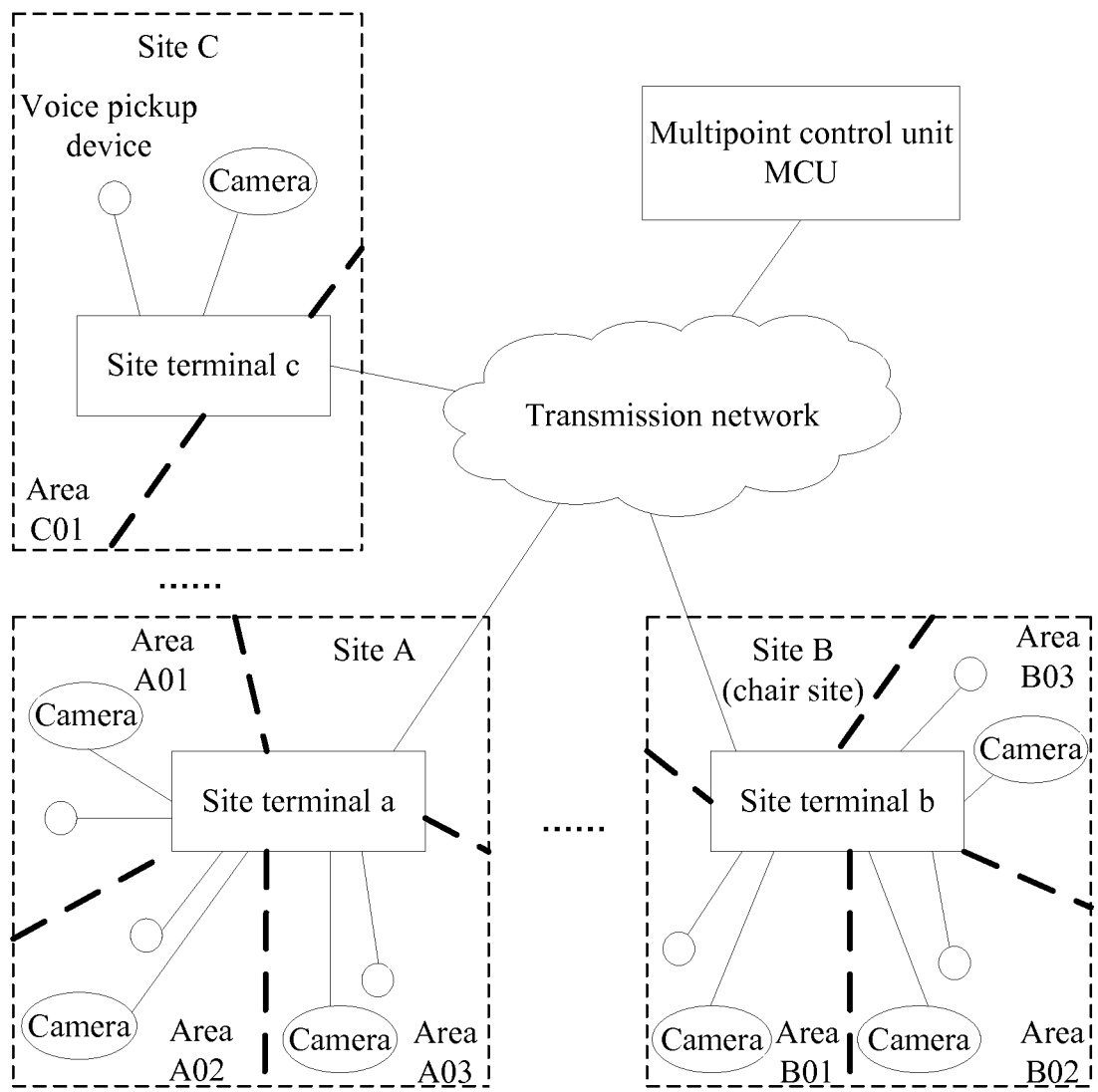
FIG. 3 is a schematic structural diagram of conference TV networking provided by Embodiment 2 of the present invention.

To make the technical solutions of the embodiments of the present invention more comprehensible, a process that a certain area (referred to as an area A01 in the following) of a certain site (referred to as a site A in the following) participating in a certain conference requests floor is taken as an example for detailed description. In this embodiment, for example, a specific implementation process in a networking structure shown in FIG. 3 is mainly taken as an example for description. For example, a chair site of the conference is a site B, a site terminal of the site B is a site terminal b, a site terminal of a site A is a site terminal a, a site terminal of a site C is a site terminal c, and so forth. One or more site terminals of each site may exist.

Referring to FIG. 4, the specific steps may include the following:

401: The site terminal a sends an area floor request to a multipoint control unit MCU.

In an application scenario, during a conference, if the area A01 at the site A needs to request floor, the site terminal a may send an area floor request to the MCU, where the area floor request may carry information such as a site identifier of a site (that is, the site A) to which the site terminal belongs and an identifier of the floor requesting area (the area A01) at the site A, and may further carry, for example, information such as a message type and the number of floor requesting areas. Definitely, the number of floor requesting areas may also be determined according to the number of the identifiers of the floor requesting areas that are carried in the area floor request.

It can be understood that, in one floor requesting area at the site, one or more participants may ask for the floor, and definitely, the area may also have no participant, but probably a group of objects or scenarios need to be shown to the other sites in the conference. One floor requesting area may correspond to one or more image pickup apparatuses (for example, cameras) capable of capturing a speaking video of the area in real time. In an actual application, the site may be divided into areas according to an image capturing range of each image pickup apparatus at the site. At this time, different areas at the site may correspond to different image pickup apparatuses, and each area at the site may correspond to one moving video. Therefore, the areas at the site can be identified by using camera labels or serial numbers of video code streams, that is, the camera labels and/or the serial numbers of video code streams are used as identifiers of corresponding areas at the site.

402: The MCU receives the area floor request from the site terminal a, and forwards the area floor request to a site terminal (the site terminal b) of a chair site (the site B) in the conference.

In an actual application, one or more areas of another site or one or more areas of the other sites in the conference may also request floor, and the MCU may also receive the area floor request from another site terminal or the area floor requests from other site terminals, and forward the area floor request or the area floor requests to the site terminal b of the chair site B; and/or, another site or other sites in the conference may also request floor, and the MCU may also receive a site floor request from another site terminal or site floor requests from other site terminals, and forward the site floor request or the site floor requests to the site terminal b of the chair site B. That is, the area floor request can be supported, and moreover, the site floor request in the prior art may also be compatible.

403: The site terminal b of the chair site B receives the area floor request forwarded by the MCU, and sends a conference control instruction to the MCU.

The conference control instruction may be, for example, a multi-picture setting instruction, a site selection instruction, an area selection instruction, an instruction of giving floor to and broadcasting a site, and an instruction of giving floor to and broadcasting an area. The site terminal b of the site B may preview the video image of speaking object by setting multiple pictures or selecting the screen, and then give floor to and broadcast the speaking object after the preview.

In an application scenario, after receiving the area floor request that carries an identifier of the floor requesting area A01 at the site A and is forwarded by the MCU, if the area A01 is given floor, the site terminal b of the chair site B may send an instruction of giving floor to and broadcasting an area for giving floor to and broadcasting the area A01 to the MCU.

In an actual application, the site terminal b of the chair site B may perform instant processing on the area floor request forwarded by the MCU. For example, if the site terminal b receives an area floor request of the site terminal a forwarded by the MCU, the site terminal b may determine whether to give floor to the area A01 that requests floor at the site A according to a user instruction or a preset policy, and if yes, send an instruction of giving floor to and broadcasting an area for giving floor to and broadcasting the area A01 to the MCU; if not, the MCU informs the site terminal b that the floor request of the area A01 fails.

Or, the site terminal b of the chair site B may first save the area floor request forwarded by the MCU, and further generate and maintain a floor requesting list (in which, an identifier of a floor requesting object may be recorded, for example, information such as an identifier of a floor requesting site and an identifier of a floor requesting area). At this time, the site terminal b of the chair site B may select, according to the user instruction or the preset policy, one floor requesting object (for example, an area or a site) from the floor requesting list for giving floor and broadcasting (herein, taking the selection of the area A01 of the site A as an example), or may also select multiple floor requesting objects (for example, areas and/or sites) at the same time for giving floor and broadcasting (herein, taking the scenario that the selected areas and/or the sites at least include the area A01 of the site A as an example).

404: The MCU receives the conference control instruction from the chair site terminal b, and performs a conference control operation according to the conference control instruction.

If a conference control operation instruction received by the MCU from the site terminal b of the chair site B is an instruction of giving floor and broadcasting (an identifier of the area A01, and further information such as a message type and a display manner indication may be carried) for broadcasting the area A01, the MCU may determine to give floor to the area A01 of the site A according to the instruction of giving floor and broadcasting, and broadcast a speaking video corresponding to the floor requesting area to a site terminal of at least one of other sites in the conference. The site terminal of the at least one of other sites controls the speaking video of a screen display area A01 at the site.

In an application scenario, the site terminal of the site where each floor requesting area or site is located may actively send the speaking video of the floor requesting area or site to the MCU. If determining to give floor to the floor requesting area or site, the MCU performs giving floor and broadcasting processing correspondingly. Or, the site terminal of the site where each floor requesting area or site is located may also send a speaking video of the floor requesting area or site to the MCU when being informed that the floor is given to the floor requesting area or site, and then the MCU performs giving floor to and broadcasting correspondingly.

In an actual application, whether the chair site terminal selects one or more floor requesting areas or sites at the same time for giving floor and broadcasting, a display position of a speaking video corresponding to the floor requesting area or site to which the floor is given and that is broadcast on the screen of each site can be determined. For example, a speaking video corresponding to each speaking area or site is displayed on a corresponding screen of each site by default (for example, a speaking video captured by a camera 1 is correspondingly displayed on a screen 1 of each site, or a speaking video sent by a site terminal of a single-screen site is correspondingly displayed on a main screen or all screens of a multi-screen site). If a display conflict occurs, cover replacement may be performed. For example, if the area A01 of the site A and the area C01 of the site C are given floor and broadcast at the same time, and the area A01 and the area C01 correspond to the same display screen at the sites by default, the MCU or the site terminal of the chair site may only select one of the area A01 of the site A and the area C01 of the site C for giving floor and broadcasting. Or, it may be first determined whether an idle screen (for example, a default screen does not correspond to the speaking object which the floor is given and that is broadcast currently) exists, and if yes, the idle screen is preferentially replaced; if not, cover replacement is performed. Or, if only one speaking area or site is given floor and broadcast once, the corresponding speaking video may be displayed on the main screen or all screens of each site by default. Or, the site terminal of the chair site (according to a user instruction or a preset policy) may designate correspondence between a speaking video corresponding to each floor requesting area or site and a display screen of each site, and then at each site, the speaking video corresponding to the floor requesting area or site is displayed on the corresponding display screen according to the designated correspondence. Or, the MCU or the chair site terminal may further prioritize the floor requesting areas or sites, and the sequence of the priorities may correspond to the sequence of the serial numbers of the screens. Speaking videos of the floor requesting areas or sites that are prioritized in the front are preferentially displayed, and at the site having few screens, generally, only a speaking video of the floor requesting area or site have the high priority is displayed. For example, the floor requesting areas or sites to which the floor is given and that are broadcast currently are successively prioritized as follows: an area B01 of the site B, the area A02 of the site A, and the area C01 of the site C, and the corresponding speaking videos may be displayed on the screen 1, the screen 2 and the screen 3 of the sites. At this time, if a certain site only has two screens, only the speaking video corresponding to the area B01 of the site B may be displayed on the screen 1 of the site, the speaking video corresponding to the area A02 of the site A is displayed on the screen 2 of the site, and the speaking video corresponding to the area C01 of the site C is not displayed. If a certain site only has one screen (that is, only a main screen), only the speaking video corresponding to the area B01 of the site B may be displayed on the main screen, the speaking video corresponding to the area A02 of the site A and the speaking video corresponding to the area C01 of the site C are not displayed, and so forth. Definitely, the MCU or the site terminal of the chair site may also combine and use the foregoing display policies according to the actual requirements, or select other display policies for display control, which are not listed in detail herein.

For example, as shown in FIG. 5-a, a great number of floor requesting areas or sites are recoded in the current floor requesting list. For example, the chair site terminal selects the area B01 of the site B, an area D02 of a site D, and a site J for giving floor and broadcasting, and designates the corresponding speaking videos are displayed on the screen 1, the screen 2 and the screen 3 of a tri-screen site. In a double-screen site, the image displayed on the screen 1 of the tri-screen site is designated to be displayed on a screen 1 of the double-screen site, and a screen 2 of the tri-screen site corresponds to a screen 2 of the double-screen site, so speaking videos corresponding to the area B01 and the area D02 are displayed in the double-screen site. In a single-screen site, the video displayed on the screen 2 of the three-screen site is designated to be displayed in the single-screen site, so the speaking video corresponding to the area D02 is displayed in the single-screen site.

Especially, if the number of the floor requesting areas or sites to which the floor is given and that are broadcast exceeds the number of the screens of the chair site or the other sites, more floor requesting areas or sites to which the floor is given and that are broadcast may be displayed at the sites in a multi-picture display manner, for example, as shown in FIG. 5-b. The site terminal of the chair site or the MCU may designate specific floor requesting areas or sites at the sites to have the speaking videos displayed in the multi-picture display manner, or the areas or sites may be randomly selected.

Further, if the floor requesting areas or sites to which the floor is given and that are broadcast include the area A01 of the site A, in order to view a panoramic image of the site A where the area A01 in the floor requesting areas or sites is located, the MCU may further splice the videos of all areas of the site where the area A01 is located into a small picture, superpose the small picture on the speaking video of the area A01, and then send the speaking video to the sites for view.

As shown in FIG. 6, for example, three cameras are deployed at a site A, which shoot images of three areas such as an area A01, an area A02, and an area A03. When the area A01 requests floor currently, the MCU may indicate that the speaking video of the area A01 is displayed on the screen 3, and splice the image of each area of the site A where the area A01 is located into a small picture and superpose the small picture on the speaking video of the area A01. Further, site information of the site A such as a site name may be superposed on the speaking video of the area A01. Specifically, the information may be superposed on a large image of the speaking video of the area A01, or may be superposed on the spliced image or a nearby area.

The video displayed at the site where the floor requesting area or site to which the floor is given and that is broadcast is located may be remain the same as that in other sites, or may be remain unchanged, or the video of the floor requesting area or site may not be displayed, or a photograph may be used to replace the image of the floor requesting area or site.

In addition, the MCU may further process the audio of the floor requesting area or site to which the floor is given and that is broadcast. For example, in a multi-screen site, multiple sound pickup devices (for example, microphones) may be deployed and placed in an area corresponding to one camera (or one moving video), and the sound pickup devices are bound as a group. Voices picked up by the sound pickup device are coded into an audio code stream, multiple audio code streams may exist in one site, and a site terminal may send the audio code streams to the MCU separately. Or, Voices at multiple different directions picked up by each group of the sound pickup devices may also be coded into an audio code stream (for example, an AAC-LD dual track), and then the audio code stream is sent to the MCU, where audio code stream information at different directions may be identified in the code stream.

The site terminal of the chair site or the MCU may further control whether the voice of the site where the speaking area to which the floor is given and that is broadcast belongs to or the voice of the speaking area is broadcast. If the voice of the site is broadcast, each site in the conference can hear the voice of the site where the floor requesting area to which the floor is given and that is broadcast belongs to; and if the voice of the speaking area is broadcast, each site in the conference can hear the voice of the floor requesting area to which the floor is given and that is broadcast, and cannot hear the voice of other areas at the site. Such two broadcasting manners may be pre-set in the MCU, or set when the conference is defined, or controlled and modified by the MCU management platform or the chairman through signaling in the conference.

When multiple floor requesting areas or sites are given floor and broadcast at the same time, the MCU may mix the voices of the speaking areas or sites (areas and/or sites) and then send the mixed voice to the sites.

The chair site terminal may further control whether to broadcast the voices of all the speaking areas or sites to which the floor is given and that are broadcast to the whole conference, or to select one or more floor requesting areas or sites to broadcast the voice, and the operation may be implemented by controlling the MCU through a message of giving floor to and broadcasting an area.

In an application scenario, when the voice of the floor requesting area to which the floor is given and that is broadcast (or the voice of the site where the floor requesting area is located) is controlled in the conference, if it is required to independently control the audio of the floor requesting area, the chair site terminal in the conference may send an audio control message to the MCU, where the message may carry an identifier of the operated site, an audio group number corresponding to a mute (or unmute) area, and an operation type (mute or unmute); and optionally, may further carry information such as the number of mute (or unmute) areas. The MCU performs audio processing according to the audio control message. If an unmute type is indicated, the voice of the speaking area is broadcast to the other sites; and if a mute type is indicated, the voice of the speaking area is not broadcast to the other sites.

Figure 7:
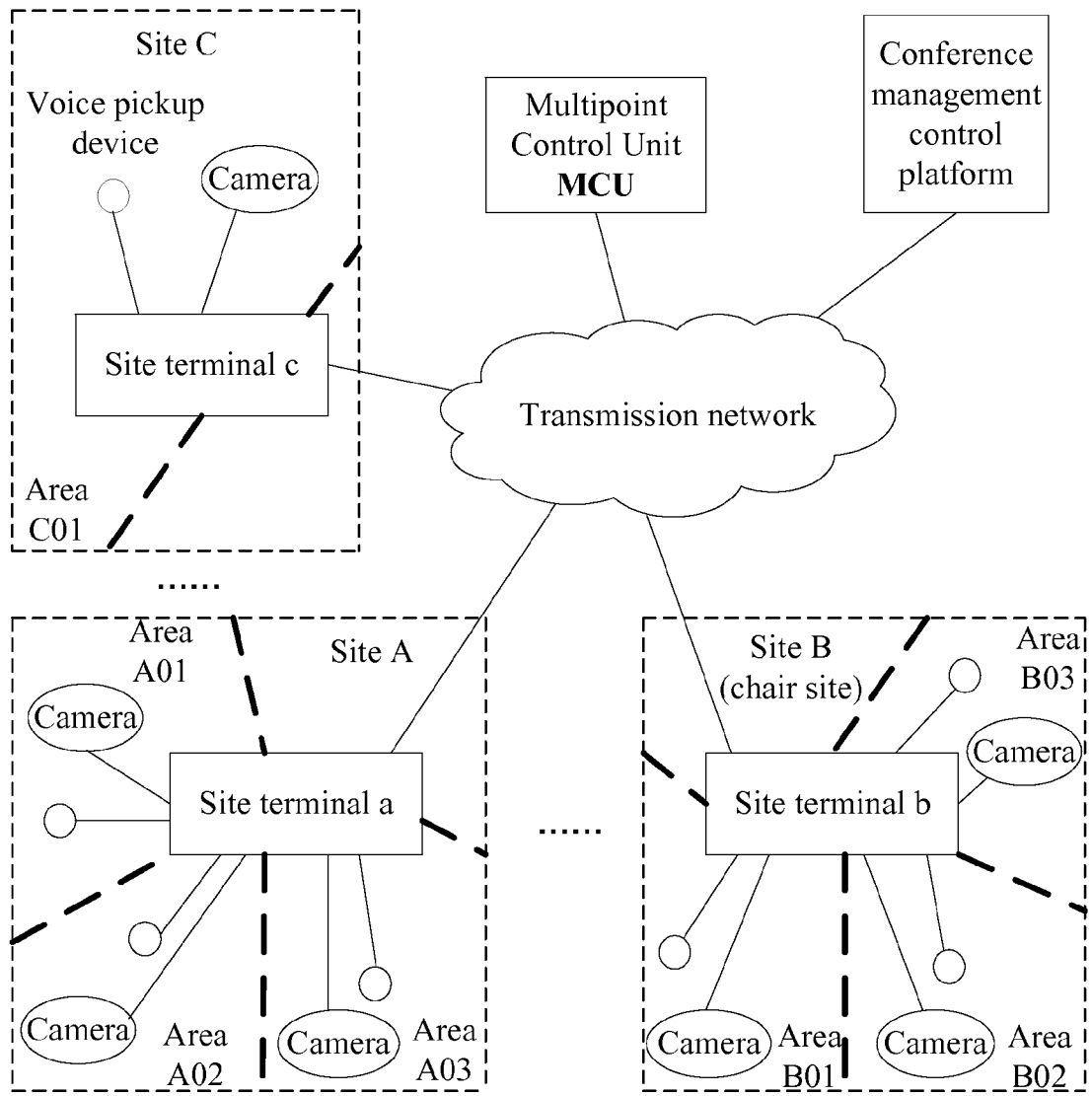
FIG. 7-a is a schematic structural diagram of another conference TV networking provided by Embodiment 2 of the present invention.

It should be noted that, the foregoing solution of this embodiment is mainly described with the case that the solution is specifically implemented in the networking structure shown in FIG. 3 as an example, and definitely, the solution may also be specifically implemented in a networking structure deployed with a conference control management platform, for example, specifically implemented in a networking structure shown in FIG. 7-a. The conference control management platform may manage and process conference related signaling. The site terminal of each site may send a floor request (for example, an area floor request or a site floor request) to the conference control management platform, or the site terminal of each site may send a floor request (for example, an area floor request or a site floor request) to the MCU, and then the MCU forwards the floor request to the conference control management platform. The conference control management platform receives a conference control instruction such as the site floor request, and serves as a chairman of the conference to manage the floor request and control the conference. The MCU performs, under the control of the conference control management platform, media stream processing operations such as giving floor to and broadcasting an area or giving floor to and broadcasting a site. It can be understood that, in such a scenario, the conference may have no chair site. If a chair site exists, the MCU or the control management platform can also forward the conference control instruction such as the site floor request to a chair site terminal, and then the chair site terminal performs the corresponding conference control operations. Similarly, the foregoing solution may also be specifically implemented in networking (for example, a multimedia sub-system networking structure) deployed with the conference control management platform and the media processing apparatus, for example, may be specifically implemented in a networking structure shown in FIG. 7-b. In such networking, the MCU is equivalent to the media processing apparatus for processing media streams capable of being interacted among the sites in the conference. The control signaling of the site for the conference may be directly sent to the conference control management platform (a service platform), and the conference control management platform serves as a chairman of the conference to manage the floor request and control the conference. The media processing apparatus may perform, under the control of the conference control management platform, media stream processing operations such as giving floor to and broadcasting an area or giving floor to and broadcasting a site. It can be understood that, in such a scenario, the conference may have no chair site. If a chair site exists, the conference control management platform can also forward the conference control instruction such as the site floor request to the chair site terminal, and then the chair site terminal performs the corresponding conference control operations. For example, the specific implementation process in the networking structure shown in FIG. 7-a or FIG. 7-b is similar to that in FIG. 3, which is not described in detail herein again. Especially, in a scenario that both the conference control management platform and the chair site exist, the conference control management platform can also forward conference related signaling from each site terminal to the chair site terminal, the chair site terminal (a conference control apparatus at terminal side) manages and processes the conference related signaling or both the chair site terminal and the control management platform manage and process the conference related signaling together. The media processing apparatus or the MCU may perform the media stream processing operations such as giving floor to and broadcasting an area or giving floor to and broadcasting a site after being triggered by the chair site terminal (specifically, directly triggered or indirectly triggered by, for example, the conference control management platform).

It can be seen from the above that, in this embodiment, the site of the conference is divided into one or more areas, and floor is requested according to the area in the conference process. When a floor requesting area in a certain site is given floor, a conference server may only broadcast a speaking video corresponding to the floor requesting area to site terminals of the other sites in the conference. The processing mechanism refines a target to which the floor is given and that is broadcast, and improves the flexibility of the conference speaking Moreover, because only the speaking video corresponding to the floor requesting area may be broadcast, an impact on network bandwidth can be reduced and bandwidth resources can be saved as much as possible.

Further, if a floor requesting area in a multi-screen site is given floor and broadcast, through selecting a proper display policy, the speaking video corresponding to the speaking area can also be definitely seen in a single-screen site. Based on an audio control mechanism, the voice corresponding to the floor requesting area can be only broadcast; and based on a multi-picture display mechanism, multiple floor requesting areas can be previewed, and given floor and broadcast at the same time.

It should be noted that, for the foregoing method embodiments, for ease of description, the method is described through a series of step combinations. However, it should be understood by persons skilled in the art that, the present invention is not limited by the sequence of the described steps, and some steps may be performed in other sequences or performed at the same time according to the present invention. It should be further understood by persons skilled in the art that the described embodiments all belong to exemplary embodiments, and the involved actions and modules are not necessarily required by the present invention.

In the foregoing embodiments, descriptions of the embodiments have different emphases, and as for parts that are not described in detail in one embodiment, reference can be made to the relevant description of the other embodiments.

To make the technical solutions of the embodiments of the present invention more comprehensible, an embodiment of the present invention further provides an apparatus for implementing the above technical solutions.

Referring to FIG. 8, a conference control apparatus 800 of the embodiment of the present invention may include: a receiving module 810, a determination module 820, and a video broadcasting module 830.

The receiving module 810 is configured to receive a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier.

The determination module 820 is configured to determine whether to give floor to the floor requesting area corresponding to the first area identifier.

The video broadcasting module 830 is configured to, if the determination module 820 determines to give floor to the floor requesting area corresponding to the first area identifier, broadcast a speaking video corresponding to the floor requesting area corresponding to the first area identifier to a site terminal of at least one of sites except the site corresponding to the first site identifier in the first conference.

The conference control apparatus 800 may be a MCU with a conference control function at network side.

If the conference control apparatus 800 is a network side conference control apparatus, the determination module 820 may include: a sending sub-module and a first determination sub-module (not shown in figures).

The sending sub-module is configured to forward the first area floor request to a site terminal of a chair site on the first conference.

The first determination sub-module is configured to, if an instruction for giving floor to and broadcasting the floor requesting area sent by the site terminal of the chair site is received, determine to give floor to the floor requesting area corresponding to the first area identifier.

In addition, the determination module 820 may be specifically configured to determine to give floor to the floor requesting area corresponding to the first area identifier according to a user instruction or a preset policy.

In an application scenario, the conference control apparatus 800 may further include:

an audio broadcasting module, configured to, if the determination module 820 determines to give floor to the floor requesting area corresponding to the first area identifier, broadcast an audio of the site corresponding to the first site identifier or the floor requesting area to a site terminal of at least one of the sites except the site corresponding to the first site identifier in the first conference.

In an application scenario, the video broadcasting module 830 may include: a superposition sub-module and a broadcasting sub-module (not shown in figures).

The superposition sub-module is configured to, if it is determined that the floor requesting area is given floor, trigger to superpose a video corresponding to one or more other areas of the site to which the floor requesting area belongs on a designated area of the speaking video corresponding to the floor requesting area, so as to obtain a superposed video.

The broadcasting sub-module is configured to broadcast the superposed video to a site terminal of at least one of the sites except the site corresponding to the first site identifier in the first conference.

In an application scenario, the conference control apparatus 800 may further include:

a request management module, configured to, after the receiving module 810 receives the first area floor request, add a record corresponding to the first area floor request to a floor requesting list of the first conference, so that the determination module 820 selects, according to the floor requesting list, the floor requesting area that corresponds to the first area identifier and to which the floor is given.

In an application scenario, the receiving module 810 is further configured to receive a second area floor request, where the second area floor request carries a second site identifier and a second area identifier, a site corresponding to the second site identifier includes multiple areas and the second site belongs to the first conference, and the second area identifier is an area identifier of a floor requesting area at the site corresponding to the second site identifier.

The request management module is further configured to add a record corresponding to the second area floor request to the floor requesting list of the first conference.

The determination module 820 is further configured to determine whether to give floor to the floor requesting area corresponding to the second area identifier.

The video broadcasting module 830 is further configured to, if the determination module 820 determines to give floor to the floor requesting area corresponding to the second area identifier, broadcast a speaking video corresponding to the floor requesting area corresponding to the second area identifier to a site terminal of at least one of the sites except the site corresponding to the second site identifier in the first conference.

In an application scenario, the conference control apparatus 800 may further include: a first display control module or a second display control module (not shown in figures).

The first display control module is configured to, if the determination module 820 determines to give floor to multiple floor requesting areas, designate display correspondence between a speaking video corresponding to each floor requesting area to which the floor is given and a screen of at least one site in the first conference, so that a site terminal of at least one of the sites except the site corresponding to the second site identifier in the first conference correspondingly displays a speaking video corresponding to each floor requesting area to which the floor is given on its screen according to the designated display correspondence.

The second display control module is configured to, if the determination module 820 determines to give floor to multiple floor requesting areas, prioritize each floor requesting area to which the floor is given, so that a site terminal of at least one of the sites except the site corresponding to the second site identifier in the first conference displays a speaking video corresponding to each floor requesting area to which the floor is given on its screen according to a sequence of priorities.

For example, a speaking video corresponding to each speaking area may be displayed on a corresponding screen of each site by default (for example, a speaking video captured by a camera 1 of a certain site is correspondingly displayed on a screen 1 of each site, or a speaking video sent by a site terminal of a single-screen site is correspondingly displayed on a main screen or all screens of a multi-screen site at the same time). If a display conflict occurs, cover replacement may be performed, or it may be first determined whether an idle screen (for example, a default screen does not correspond to the speaking object to which the floor is given and that is broadcast currently) exists, and if yes, the idle screen is preferentially replaced; if not, the cover replacement is performed. Or, if only one speaking area is given floor and broadcast once, the corresponding speaking video may be displayed on the main screen or all screens of each site by default. Or, the conference control apparatus 800 (according to a user instruction or a preset policy) designates correspondence between a speaking video corresponding to each floor requesting area and a display screen of each site, and then at each site, the speaking video corresponding to the floor requesting area is displayed on the corresponding display screen according to the designated correspondence. Or, the conference control apparatus 800 may prioritize the floor requesting areas. The sequence of the priorities may correspond to a sequence of serial numbers of the screens, and speaking videos of the floor requesting areas that are prioritized in the front are preferentially displayed. For example, in a single-screen site, only a speaking video of a floor requesting area with the highest priority can be displayed. Definitely, the conference control apparatus 800 may also combine and use the foregoing display policies according to the actual requirements, or select other display policies, which are not listed in detail herein.

It can be understood that, the conference control apparatus 800 of this embodiment may be the MCU or the conference control management platform or the chair site terminal in the forgoing method embodiments, and may be used in cooperation to implement all the technical solutions in the foregoing method embodiments. The functions of the functional modules may be specifically implemented according to the methods in the foregoing method embodiments. Reference may be made to the relevant description in the foregoing embodiments for the specific implementation process, and the details are not described in detail herein again.

It can be seen from the above that, in this embodiment, the site of the conference is divided into one or more areas, and floor is requested according to the area in the conference process. When giving floor to a floor requesting area in a certain site, the conference control apparatus 800 may only trigger broadcasting of a speaking video corresponding to the floor requesting area to a site terminal of at least one of the other sites in the conference. The processing mechanism refines a target to which the floor is given and that is broadcast, and improves the flexibility of the conference speaking Moreover, because only the speaking video corresponding to the floor requesting area may be broadcast, an impact on network bandwidth can be reduced and bandwidth resources can be saved as much as possible.

Figure 9:
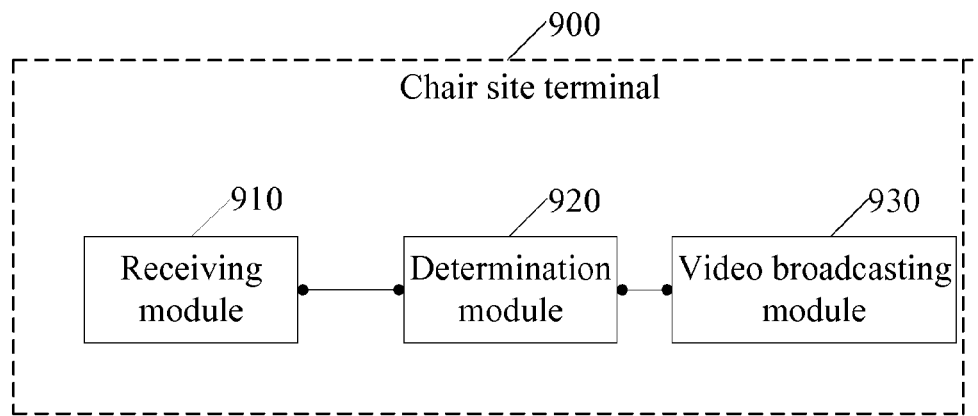
FIG. 9 is a schematic diagram of a chair site terminal provided by an embodiment of the present invention.

Referring to FIG. 9, a chair site terminal 900 of an embodiment of the present invention may include:

a receiving module 910, configured to receive a first area floor request, where the first area floor request carries a first site identifier and a first area identifier, a site corresponding to the first site identifier includes multiple areas and belongs to a first conference, and the first area identifier is an area identifier of a floor requesting area at the site corresponding to the first site identifier;

a determination module 920, configured to determine whether to give floor to the floor requesting area corresponding to the first area identifier; and a video broadcasting module 930, configured to, if the determination module 920 determines to give floor to the floor requesting area corresponding to the first area identifier, trigger a media processing apparatus to broadcast a speaking video corresponding to the floor requesting area corresponding to the first area identifier to a site terminal of at least one of sites except the site corresponding to the first site identifier in the first conference.

In an application scenario, the determination module 920 may be specifically configured to determine to give floor to the floor requesting area corresponding to the first area identifier according to a user instruction or a preset policy.

In an application scenario, the chair site terminal 900 may further include:

an audio broadcasting module, configured to, if the determination module 920 determines to give floor to the floor requesting area corresponding to the first area identifier, trigger the media processing apparatus to broadcast an audio of the site corresponding to the first site identifier or the floor requesting area to a site terminal of at least one of the sites except the site corresponding to the first site identifier in the first conference.

In an application scenario, the chair site terminal 900 may further include:

a request management module, configured to, after the receiving module 910 receives the first area floor request, add a record corresponding to the first area floor request to a floor requesting list of the first conference, so as to select, according to the floor requesting list, the floor requesting area that corresponds to the first area identifier and to which the floor is given.

In an application scenario, the receiving module 910 is further configured to receive a second area floor request, where the second area floor request carries a second site identifier and a second area identifier, a site corresponding to the second site identifier includes multiple areas and the second site belongs to the first conference, and the second area identifier is an area identifier of a floor requesting area at the site corresponding to the second site identifier.

The request management module is further configured to add a record corresponding to the second area floor request to the floor requesting list of the first conference.

The determination module 920 is further configured to determine whether to give floor to the floor requesting area corresponding to the second area identifier.

The video broadcasting module 930 is further configured to, if the determination module 920 determines to give floor to the floor requesting area corresponding to the second area identifier, trigger the media processing apparatus to broadcast a speaking video corresponding to the floor requesting area corresponding to the second area identifier to a site terminal of at least one of the sites except the site corresponding to the second site identifier in the first conference.

In an application scenario, the chair site terminal 900 may further include: a first display control module or a second display control module (not shown in figures).

The first display control module is configured to, if the determination module 920 determines to give floor to multiple floor requesting areas, designate display correspondence between a speaking video corresponding to each floor requesting area to which the floor is given and a screen of at least one site in the first conference, so that a site terminal of at least one of the sites except the site corresponding to the second site identifier in the first conference correspondingly displays a speaking video corresponding to each floor requesting area to which the floor is given on its screen according to the designated display correspondence.

The second display control module is configured to, if the determination module 920 determines to give floor to multiple floor requesting areas, prioritize each floor requesting area to which the floor is given, so that a site terminal of at least one of the sites except the site corresponding to the second site identifier in the first conference displays a speaking video corresponding to each floor requesting area to which the floor is on its screen according to a sequence of priorities.

For example, a speaking video corresponding to each speaking area may be displayed on a corresponding screen of each site by default (for example, a speaking video captured by a camera 1 of a certain site is correspondingly displayed on a screen 1 of each site, or a speaking video sent by a site terminal of a single-screen site is correspondingly displayed on a main screen or all screens of a multi-screen site at the same time). If a display conflict occurs, cover replacement may be performed, or it may be first determined whether an idle screen (for example, a default screen does not correspond to the speaking object to which the floor is given and that is broadcast currently) exists, and if yes, the idle screen is first replaced; if not, the cover replacement is performed. Or, if only one speaking area is given floor and broadcast once, the corresponding speaking video may be displayed on the main screen or all screens of each site by default. Or, the chair site terminal 900 (according to a user instruction or a preset policy) designates correspondence between a speaking video corresponding to each floor requesting area and a display screen of each site, and then at each site, the speaking video corresponding to the floor requesting area is displayed on the corresponding display screen according to the designated correspondence. Or, the chair site terminal 900 may prioritize the floor requesting areas. The sequence of the priorities may correspond to a sequence of serial numbers of the screens, and speaking videos of the floor requesting areas that are prioritized in the front are preferentially displayed. For example, in a single-screen site, only a speaking video of a floor requesting area with the highest priority can be displayed. Definitely, the chair site terminal 900 may also combine and use the foregoing display policies according to the actual requirements, or select other display policies, which are not listed in detail herein.

It can be understood that, the chair site terminal 900 of this embodiment may be the chair site terminal in the forgoing method embodiments, and may be used in cooperation to implement all the technical solutions in the foregoing method embodiments. The functions of the functional modules may be specifically implemented according to the methods in the foregoing method embodiments. Reference may be made to the relevant description in the foregoing embodiments for the specific implementation process, and the details are not described in detail herein again.

It can be seen from the above that, in this embodiment, the site of the conference is divided into one or more areas, and floor is requested according to the area in the conference process. When giving floor to a floor requesting area in a certain site, the chair site terminal 900 may trigger the media processing apparatus to broadcast the speaking video corresponding to the floor requesting area to a site terminal of at least one of the other sites in the conference. The processing mechanism refines a target to which the floor is given and that is broadcast, and improves the flexibility of the conference speaking Moreover, because only the speaking video corresponding to the floor requesting area may be broadcast, an impact on network bandwidth can be reduced and bandwidth resources can be saved as much as possible.

Figure 10:
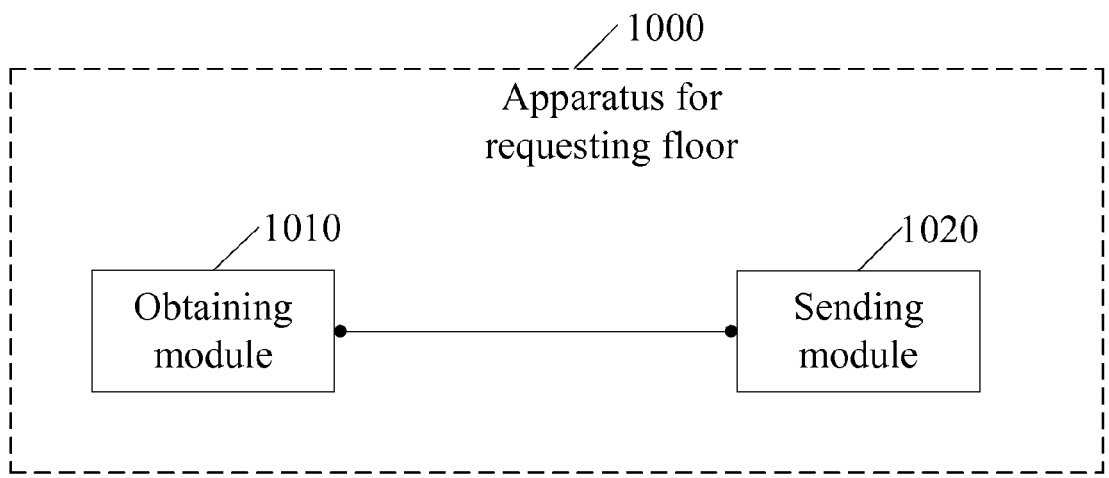
FIG. 10 is a schematic diagram of an apparatus for requesting floor provided by an embodiment of the present invention.

Referring to FIG. 10, an embodiment of the present invention may further provide an apparatus for requesting floor 1000, where the apparatus may include:

an obtaining module 1010, configured to obtain a first site identifier and a first area identifier, where a site corresponding to the first site identifier includes multiple areas and belongs to a first conference, and the first area identifier is an area identifier of a floor requesting area at the site corresponding to the first site identifier; and a sending module 1020, configured to generate and send a first area floor request carrying the first site identifier and the first area identifier, so that after receiving the first area floor request, if determining to give floor to the floor requesting area corresponding to the first area identifier, a conference control apparatus triggers broadcasting of a speaking video corresponding to the floor requesting area to a site terminal of at least one of sites except the site corresponding to the first site identifier in the first conference.

In an application scenario, the apparatus for requesting floor 1000 may be a site terminal or other apparatus.

It can be understood that, the apparatus for requesting floor 1000 of this embodiment may be the site terminal a in the forgoing method embodiments, and may be used in cooperation to implement all the technical solutions in the foregoing method embodiments. The functions of the functional modules may be specifically implemented according to the method in the foregoing method embodiments. Reference may be made to the relevant description in the foregoing embodiments for the specific implementation process, and the details are not described in detail herein again.

Figure 11:
FIG. 11 is a schematic diagram of a conference system provided by an embodiment of the present invention.

Referring to FIG. 11, a conference system provided by an embodiment of the present invention may include:

an apparatus for requesting floor 1110 and a conference control apparatus 1120.

The apparatus for requesting floor 1110 is configured to obtain a first site identifier and a first area identifier, where a site corresponding to the first site identifier includes multiple areas and belongs to a first conference, and the first area identifier is an area identifier of a floor requesting area at the site corresponding to the first site identifier; and generate and send a first area floor request carrying the first site identifier and the first area identifier.

The conference control apparatus 1120 is configured to receive the first area floor request; and if determining to give floor to the floor requesting area corresponding to the first area identifier, trigger a media processing apparatus or the conference control apparatus to broadcast a speaking video corresponding to the floor requesting area to a site terminal of at least one of sites except the site corresponding to the first site identifier in the first conference.

The conference control apparatus 1120 may be further configured to, if determining to give floor to the floor requesting area corresponding to the first area identifier, trigger the media processing apparatus or the conference control apparatus to broadcast an audio of the floor requesting area corresponding to the first area identifier or the site corresponding to the first site identifier to a site terminal of at least one of the sites except the site corresponding to the first site identifier in the first conference.

In an application scenario, if determining to give floor to the floor requesting area corresponding to the first area identifier, the conference control apparatus 1120 triggers the media processing apparatus or the conference control apparatus to superpose a video corresponding to one or more other areas of the site to which where the floor requesting area belongs on a designated area of the speaking video of the floor requesting area corresponding to the first area identifier, so as to obtain a superposed video; and triggers the media processing apparatus or the conference control apparatus to broadcast the superposed video to a site terminal of at least one of the sites except the site corresponding to the first site identifier in the first conference.

In an application scenario, the conference control apparatus 1120 may be further configured to, if determining to give floor to multiple floor requesting areas, designate display correspondence between a speaking video corresponding to each floor requesting area to which the floor is given and a screen of at least one site in the first conference, so that a site terminal of the at least one site in the first conference correspondingly displays a speaking video corresponding to each floor requesting area to which the floor is given on its screen according to the designated display correspondence; or if determining to give floor to multiple floor requesting areas, prioritize each floor requesting area to which the floor is given, so that a site terminal of at least one site in the first conference displays a speaking video corresponding to each floor requesting area to which the floor is given on its screen according to a sequence of priorities.

For example, a speaking video corresponding to each speaking area may be displayed on a corresponding screen of each site by default (for example, a speaking video captured by a camera 1 of a certain site is correspondingly displayed on a screen 1 of each site, or a speaking video sent by a site terminal of a single-screen site is correspondingly displayed on a main screen or all screens of a multi-screen site at the same time). If a display conflict occurs, cover replacement may be performed, or it may be first determined whether an idle screen (for example, a default screen does not correspond to the speaking object to which the floor is given and that is broadcast currently) exists, and if yes, the idle screen is first replaced; if not, the cover replacement is performed. Or, if only one speaking area is given floor and broadcast once, the corresponding speaking video may be displayed on the main screen or all screens of each site by default. Or, the conference control apparatus 1120 (according to a user instruction or a preset policy) designates correspondence between a speaking video corresponding to each floor requesting area and a display screen of each site, and then at each site, the speaking video corresponding to the floor requesting area is displayed on the corresponding display screen according to the designated correspondence. Or, the conference control apparatus 1120 may prioritize the floor requesting areas. The sequence of the priorities may correspond to a sequence of serial numbers of the screens, and speaking videos of the floor requesting areas that are prioritized in the front are preferentially displayed. For example, in a single-screen site, only a speaking video of a floor requesting area with the highest priority can be displayed. Definitely, the conference control apparatus 1120 may also combine and use the foregoing display policies according to the actual requirements, or select other display policies, which are not listed in detail herein.

In an application scenario, the apparatus for requesting floor 1110 may be a site terminal or other apparatus, and the conference control apparatus 1120 may be a conference control management platform or a multipoint control unit or a chair site terminal.

To sum up, in the embodiment of the present invention, the site of the conference is divided into one or more areas, and floor is requested according to the area in the conference process. When a floor requesting area in a certain site is given floor, a conference server may only broadcast the speaking video corresponding to the floor requesting area to site terminals of the other sites in the conference. The processing mechanism refines a target to which the floor is given and that is broadcast, and improves the flexibility of the conference speaking Moreover, because only the speaking video corresponding to the floor requesting area may be broadcast, an impact on network bandwidth can be reduced and bandwidth resources can be saved as much as possible.

Further, if a floor requesting area in a multi-screen site is given floor and broadcast, by selecting a proper display policy, a speaking video corresponding to a speaking area can also be definitely seen in a single-screen site. Based on an audio control mechanism, the voice corresponding to the floor requesting area can be only broadcast; and based on a multi-picture display mechanism, multiple floor requesting areas can be previewed, and given floor and broadcast at the same time.

Persons of ordinary skill in the art should understand that all or a part of the steps of the method according to the embodiments of the present invention may be implemented by a program instructing relevant hardware. The program may be stored in a computer readable storage medium, such as a read only memory, a random access memory, a magnetic disk or an optical disk.

The conference control method, and the relevant apparatus and system provided by the embodiments of the present invention are described in detail above. The principle and implementation of the present invention are described herein through specific examples. The description about the embodiments of the present invention is only provided for ease of understanding of the method and core ideas of the present invention. Meanwhile, persons of ordinary skill in the art can make variations and modifications to the present invention in terms of the specific implementations and application scopes according to the ideas of the present invention. Therefore, the specification shall not be construed as a limit to the present invention.

What is claimed is:

1. A conference control method, comprising:
   receiving a first area floor request, wherein the first area floor request carries a first site identifier and a first area identifier, a site corresponding to the first site identifier comprises multiple areas and belongs to a first conference, and the first area identifier is an area identifier of a floor requesting area at the site corresponding to the first site identifier; and
   if determining to give floor to the floor requesting area corresponding to the first area identifier, broadcasting a speaking video corresponding to the floor requesting area to a site terminal of at least one of sites except the site corresponding to the first site identifier in the first conference.

2. The method according to claim 1, further comprising:
   broadcasting an audio of the floor requesting area corresponding to the first site identifier to the site terminal of at least one of the sites except the site corresponding to the first site identifier in the first conference.

3. The method according to claim 1, wherein the determining to give floor to the floor requesting area comprises:
   forwarding the first area floor request to a site terminal of a chair site in the first conference, and if receiving an instruction for giving floor to and broadcasting the floor requesting area corresponding to the first area identifier from the site terminal of the chair site, determining to give floor to the floor requesting area corresponding to the first area identifier.

4. The method according to claim 1, wherein the broadcasting the speaking video corresponding to the floor requesting area to the site terminal of at least one of the sites except the site corresponding to the first site identifier in the first conference comprises:
   superposing a video corresponding to one or more other areas of the site to which the floor requesting area belongs on a designated area of the speaking video corresponding to the floor requesting area, obtaining a superposed video; and
   broadcasting the superposed video to the site terminal of at least one of the sites except the site corresponding to the first site identifier in the first conference.

5. The method according to claim 1, further comprising:
   after the first area floor request is received, adding a record corresponding to the first area floor request to a floor requesting list of the first conference;
   selecting, according to the floor requesting list, the floor requesting area that corresponds to the first area identifier.

6. The method according to claim 1, further comprising:
   receiving a second area floor request, wherein the second area floor request carries a second site identifier and a second area identifier, a site corresponding to the second site identifier comprises multiple areas and belongs to the first conference, and the second area identifier is an area identifier of a floor requesting area at the site corresponding to the second site identifier;
   adding a record corresponding to the second area floor request to a floor requesting list of the first conference; and
   if determining to give floor to the floor requesting area corresponding to the second area identifier, broadcasting a speaking video of the floor requesting area corresponding to the second area identifier to a site terminal of at least one of sites except the site corresponding to the second site identifier in the first conference.

7. The method according to claim 1, further comprising:
   if determining to give floor to multiple floor requesting areas, designating display correspondence between a speaking video corresponding to each floor requesting area to which the floor is given and a screen of at least one site in the first conference, so that a site terminal of the at least one site in the first conference correspondingly displays a speaking video corresponding to each floor requesting area to which the floor is given on its screen according to the designated display correspondence.

8. The method according to claim 1, further comprising:
   if determining to give floor to multiple floor requesting areas, prioritizing each floor requesting area to which the floor is given, so that a site terminal of at least one site in the first conference displays a speaking video corresponding to each floor requesting area to which the floor is given on its screen according to a sequence of priorities.

9. The method according to claim 1, wherein the first area floor request carries the first site identifier, multiple area identifiers, and a number of floor requesting areas at the site corresponding to the multiple area identifiers.

10. The method according to claim 1, wherein the first area identifier comprises at least one of:
    a camera label and a serial number of a video code stream.

11. The method according to claim 1, wherein the determining to give floor to the floor requesting area comprises:
    according to a user instruction, determining to give floor to the floor requesting area corresponding to the first area identifier.

12. The method according to claim 1, wherein the determining to give floor to the floor requesting area comprises:
    according to a preset policy, determining to give floor to the floor requesting area corresponding to the first area identifier.

13. A conference control apparatus, comprising:
    a receiving module, configured to receive a first area floor request, wherein the first area floor request carries a first site identifier and a first area identifier, a site corresponding to the first site identifier comprises multiple areas and belongs to a first conference, and the first area identifier is an area identifier of a floor requesting area at the site corresponding to the first site identifier;
    a determination module, configured to determine whether to give floor to the floor requesting area corresponding to the first area identifier; and
    a video broadcasting module, configured to, if the determination module determines to give floor to the floor requesting area corresponding to the first area identifier, broadcast a speaking video corresponding to the floor requesting area to a site terminal of at least one of sites except the site corresponding to the first site identifier in the first conference.

14. The conference control apparatus according to claim 13, further comprising:
    an audio broadcasting module, configured to, if the determination module determines to give floor to the floor requesting area corresponding to the first area identifier, broadcast an audio of the floor requesting area corresponding to the first site identifier to the site terminal of at least one of the sites except the site corresponding to the first site identifier in the first conference.

15. The conference control apparatus according to claim 13, further comprising:
the video broadcasting module is configured to, if the determination module determines to give floor to the floor requesting area corresponding to the first area identifier, superpose a video corresponding to one or more other areas of the site to which the floor requesting area belongs on a designated area of the speaking video of the floor requesting area corresponding to the first area identifier, obtain a superposed video; and broadcast the superposed video to the site terminal of at least one of the sites except the site corresponding to the first site identifier in the first conference.

16. A chair site terminal, comprising:
a receiving module, configured to receive a first area floor request, wherein the first area floor request carries a first site identifier and a first area identifier, a site corresponding to the first site identifier comprises multiple areas and belongs to a first conference, and the first area identifier is an area identifier of a floor requesting area at the site corresponding to the first site identifier;
a determination module, configured to determine whether to give floor to the floor requesting area corresponding to the first area identifier; and
a video broadcasting module, configured to, if the determination module determines to give floor to the floor requesting area corresponding to the first area identifier, trigger a media processing apparatus to broadcast a speaking video of the floor requesting area corresponding to the first area identifier to a site terminal of at least one of sites except the site corresponding to the first site identifier in the first conference.

17. The chair site terminal according to claim 16, further comprising:
an audio broadcasting module, configured to, if the determination module determines to give floor to the floor requesting area corresponding to the first area identifier, trigger the media processing apparatus to broadcast an audio of the floor requesting area to the site terminal of at least one of the sites except the site corresponding to the first site identifier in the first conference.

18. An apparatus for requesting floor, comprising:
an obtaining module, configured to obtain a first site identifier and a first area identifier, wherein a site corresponding to the first site identifier comprises multiple areas and belongs to a first conference, and the first area identifier is an area identifier of a floor requesting area at the site corresponding to the first site identifier; and
a sending module, configured to generate and send a first area floor request carrying the first site identifier and the first area identifier, so that after receiving the first area floor request, if determining to give floor to the floor requesting area corresponding to the first area identifier, a conference control apparatus triggers broadcasting of a speaking video corresponding to the floor requesting area to a site terminal of at least one of sites except the site corresponding to the first site identifier in the first conference.

* * * * *

UNITED STATES PATENT AND TRADEMARK OFFICE
CERTIFICATE OF CORRECTION

PATENT NO. : 8,564,637 B2  
APPLICATION NO. : 13/624454  
DATED : October 22, 2013  
INVENTOR(S) : Jiaoli Wu Page 1 of 1

It is certified that error appears in the above-identified patent and that said Letters Patent is hereby corrected as shown below:

Title page, item (71), Applicant's City of Residence "Guangdong (CN)" should read -- Shenzhen (CN) --.

Signed and Sealed this
Eighteenth Day of February, 2014

Michelle K. Lee
*Deputy Director of the United States Patent and Trademark Office*